United States Patent [19]
Magaraggia

[11] Patent Number: 6,068,132
[45] Date of Patent: May 30, 2000

[54] PERFECTED REACTOR FOR LIQUIDS PURIFICATION

[75] Inventor: Flavio Magaraggia, Vicenza, Italy

[73] Assignee: Comer SpA, Caltrano, Italy

[21] Appl. No.: 09/230,481

[22] PCT Filed: May 27, 1998

[86] PCT No.: PCT/EP98/03119

§ 371 Date: Jan. 26, 1999

§ 102(e) Date: Jan. 26, 1999

[87] PCT Pub. No.: WO98/54402

PCT Pub. Date: Dec. 3, 1998

[30] Foreign Application Priority Data

May 30, 1997 [IT] Italy .................................. VI97A0081

[51] Int. Cl.[7] .............................. B03D 1/14; B03D 1/16; B03D 1/24
[52] U.S. Cl. ........................ 209/170; 209/169; 210/221.2
[58] Field of Search ................. 210/221.2, 194, 210/197, 221.1, 219; 209/170, 169

[56] References Cited

U.S. PATENT DOCUMENTS

| | | |
|---|---|---|
| 4,431,531 | 2/1984 | Hollingsworth . |
| 5,335,785 | 8/1994 | Kawatra et al. . |
| 5,454,935 | 10/1995 | Magaraggia . |
| 5,650,044 | 7/1997 | Serres . |

FOREIGN PATENT DOCUMENTS

| | | |
|---|---|---|
| 0 634 519 A1 | 1/1995 | European Pat. Off. . |
| 0 674 040 A1 | 9/1995 | European Pat. Off. . |
| 0 798 416 A1 | 10/1997 | European Pat. Off. . |
| 80/00423 | 3/1980 | WIPO . |

*Primary Examiner*—Thomas M. Lithgow
*Attorney, Agent, or Firm*—Watson Cole Grindle Watson, P.L.L.C.

[57] ABSTRACT

The invention realises a reactor for liquids purification comprising: a tank containing the liquid to be purified; a plurality of upper injectors suitable for introducing in the tank said liquid to be purified with an aeriform substance dispersed in it in the form of bubbles; one or more blades arranged inside said tank and connected with a rotating shaft; one or more intermediate injectors cooperating with said first interception means suitable for sucking the liquid up and introducing it again in the tank in a lower position in comparison with said upper injectors. Said reactor comprises at least a low box, arranged at an intermediate height in said tank, suitable for receiving the descending liquid during a purification phase, which is supplied with interception means suitable for permitting the suction and the re-flowing of said liquid inside said tank.

10 Claims, 4 Drawing Sheets

PERFECTED REACTOR FOR LIQUIDS PURIFICATION

The invention concerns a perfected reactor suitable for realising liquids purification, particularly suitable for realising the de-inking of aqueous suspensions of recycled paper.

As it is known, fittings, which, using the flotation, realise the de-inking of fibrous suspensions of recycled paper, are used in the paper working field.

In particular a reactor belonging to the known technique for liquids purification is described in the patent having reference number MI93A001455, registered on behalf of the same depositor of the present invention. Said reactor is substantially formed of a cylindrical tank in which the liquid to be purified is introduced by a sequence of injectors which are arranged in a circumference in comparison with the tank itself just below the free surface of the suspension to be purified.

The suspension to be purified is pumped in the tank through a feeding pipeline, in parallel to which, a suction pipeline which communicates with the outside, is arranged. The liquid through the feeding pipeline sucks air up from the outside, by Venturi effect, through the suction pipeline, in order that inside the tank an emulsion, formed of the suspension to be purified, in which air bubbles are dispersed, is introduced.

The air bubbles, helped by the presence of chemical reagents, capture the impurities present in the liquid and they carry them away, purificating it.

A first flotation, which leads to the formation of a foam loaded with impurities, is this way realised. Said foam rises towards the surface, where a rotating spatula conveys it towards an evacuation conduct, while the liquid comes down towards the bottom of the tank where a suction hood is present.

The liquid is therefore sucked up by said suction hood through further delivery pipelines connected in parallel to further suction pipelines, is re-introduced in an intermediate position in the tank by further injectors in order to undergo a second flotation.

This way the liquid already partially purified which, re-introduced in the tank, during the descent, undergoes a counter-washing by the air bubbles which rise and which are loaded again with the impurities, according to the same process previously described.

When the liquid re-enter for the second time in the suction hood arranged on the bottom of the tank, it has substantially finished its purification cycle, and by pumps is conveyed for the utilisation.

The known technique includes that the purification is always realised using two machineries of the described kind, arranged in a cascade connection and this in order to obtain an optimum purification of the liquid to be treated.

The present invention sets a purpose for realising a perfected reactor which, having the same dimensions of the reactors belonging to the known technique, and in particular of the reactor of the patent here mentioned, permits to realise the same degree of purification which, according to the known technique, is obtained using two of said reactors belonging to the known technique, arranged in a cascade connection.

The mentioned purpose is achieved by the realisation of a reactor for liquids purification which, according to the main claim, comprises:

a tank suitable for containing the liquid to be purified;
a plurality of upper injectors arranged in a circumference in comparison with said tank, in correspondence with the free surface of the liquid to be purified, suitable for introducing in the tank itself said liquid to be purified with an aeriform substance dispersed in it, in the from of bubbles;
one or more blades arranged inside said tank and connected with a rotating shaft suitable for set them on rotation in order to agitate said liquid in which they are immersed;
one or more intermediate injectors cooperating with said first interception means arranged on the bottom of said tank and suitable for sucking up and re-introducing in the tank in a lower position, in comparison with said upper injectors, the liquid itself with an aeriform substance dispersed in it, in the form of bubbles;
draining means suitable for moving away from the free surface of said liquid the foam formed by said bubbles loaded with the impurities captured from said liquid;

and it is characterised in that said reactor comprises at least a low box arranged inside said tank at an intermediate height, suitable for receiving the descending liquid during the purification phase, being said low box supplied with second interception means suitable for permitting the suction and the re-flowing of said liquid inside said tank.

Advantageously the perfected reactor of the invention permits to install a unique operative unit instead of two of it, obtaining the same purification efficiency with lesser encumbrances.

Still advantageously the installation of a unique operative unit permits to reduce the length of the pipelines and the number of valves, for the benefit of the saving in the installation and maintenance expenses.

Not last advantage is also that, using a unique reactor instead of two of it, the quantity of purified liquid which inevitably is moved away with the foams, is reduced.

According to a preferred embodiment said low box has substantially the shape of a basin with a bottom slightly conical, converging towards the centre and it is arranged inside the tank in a position substantially median in comparison with the height.

Both on the bottom of said tank and inside said basin, interception means of the liquid are present. These are formed of a hood with the shape of a truncated cone, converging upwards, laterally to which a pipeline that, by pumping means with which it is connected, conveys again the liquid inside the tank for a further purification, branches out. To sum up, the presence of such low box arranged at an intermediate position in comparison with the height of said tank, permits to realise a further flotation of the liquid to be purified inside the tank.

BRIEF DESCRIPTION OF THE DRAWINGS

The said purpose and advantages will be better pointed out during the description of a preferred embodiment of the invention given as an example but not as a restriction and represented in the enclosed drawings where.

Figure 1:
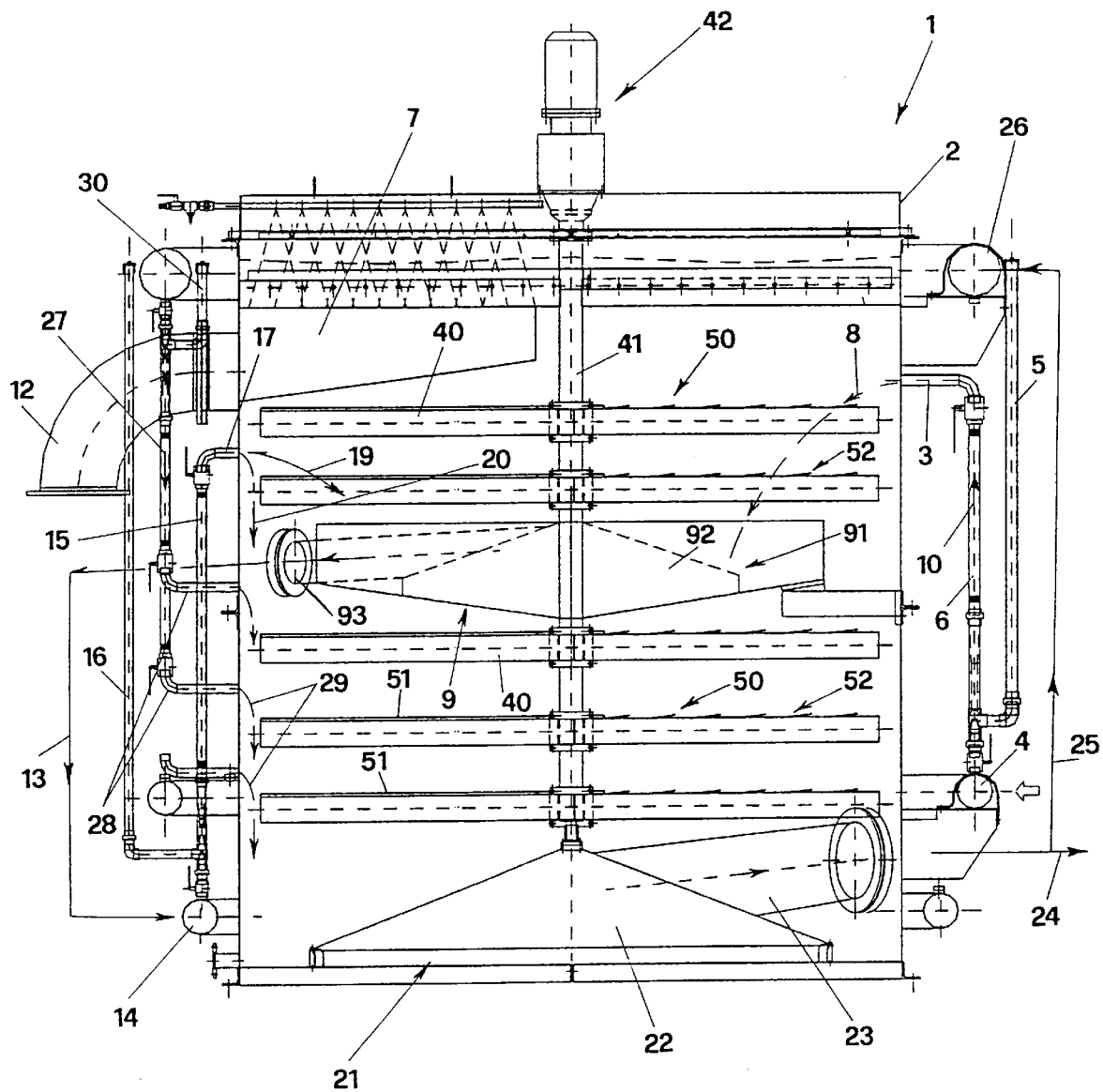
FIG. 1 shows the reactor of the invention represented in a longitudinal section with the indication of the directions of the flows during the functioning.

As FIG. 1 shows, the reactor of the invention, indicated as a whole with 1, is formed of a cylindrical tank 2 in which a sequence of upper injectors 3, that are arranged in a circumference in comparison with the tank itself, introduces in it, by a first feeding pipeline 6, the liquid to be purified which comes from a feed manifold 4 with which said first pipeline 6 is connected.

A first suction pipeline 5 which, by Venturi effect, sucks air up from the outside, when the liquid to be purified flows, according to the direction 10, through the first feeding pipeline 6 which leads to the injectors 3, is arranged in parallel to the feeding pipeline 6. This way, an emulsion formed of the liquid to be purified, mixed with air, where the air bubbles, helped by chemical reagents which are present, capture the impurities present in the liquid, is introduced inside the tank.

This way, a first flotation which produces a foam that is brought towards the surface where it is removed by a rotating blade 7 which conveys it towards a draining conduct 12, is obtained.

The liquid, which descends according to the direction 8, is therefore received at a middle height by a low box 9 which, as it can be observed, presents the shape of a basin whose bottom 91 is converging towards the centre of the tank.

Interception means which are formed of a hood 92, are arranged inside said low box 9. Said hood has a conicity converging upwards, that communicates with a pipeline 93, by which pumping means, not represented, suck up the liquid that is brought, according to the direction 13, towards a second manifold 14.

A second feeding pipeline 15 branches out from said second manifold. A second suction pipeline 16 which communicates with the outside and permits the liquid which flows through said second feeding pipeline 15 to suck air up by Venturi effect, is arranged in parallel to it.

The liquid is therefore immediately re-introduced above the low box 9 by a first intermediate injector 17, arranged above the low box 9 itself and below said upper injectors 3.

A second flotation of the liquid which has been already purified, happens in correspondence with said first intermediate injector 17. Indeed, the air emulsified with the liquid which is re-introduced, is mixed with the impurities still present in the liquid and comes to the surface in the form of a foam which is removed by the rotating blade 7 and pushed away through the draining pipeline 12.

A first part, indicated with 19, of the liquid which is re-introduced in the tank by the upper injectors 3, as FIG. 1 shows, re-enters in the low box 9 from which it is made to flow again, according to the direction 13, while a second part, indicated with 20, comes towards the bottom of the tank.

On the bottom of the tank, second interception means, indicated as a whole with 21, are present. Said interception means comprise a hood 22 with a conicity converging upwards, and a pipeline 23, with it connected, which permits the suction of the purified liquid by pumping means.

A part 24 of liquid is for the utilisation, and it is the "accepted", while the remaining part 25 flows in a third manifold 26 from which, through a third pipeline 27 and through further intermediate ejectors 28, it is re-introduced in the tank, upon emulsion with air which is sucked up by Venturi effect through third suction pipeline 30 which is arranged in parallel to said third feeding pipeline 27.

The liquid which flows towards the bottom of the tank according to direction 29, results therefore quite completely purified.

It is possible to comprehend for what it has been said, that the liquid runs many times inside the tank 2, in which it realises many flotations obtaining, this way, the same purification result which is usually obtained, using two reactors belonging to the known technique in the already mentioned patent.

Figure 2:
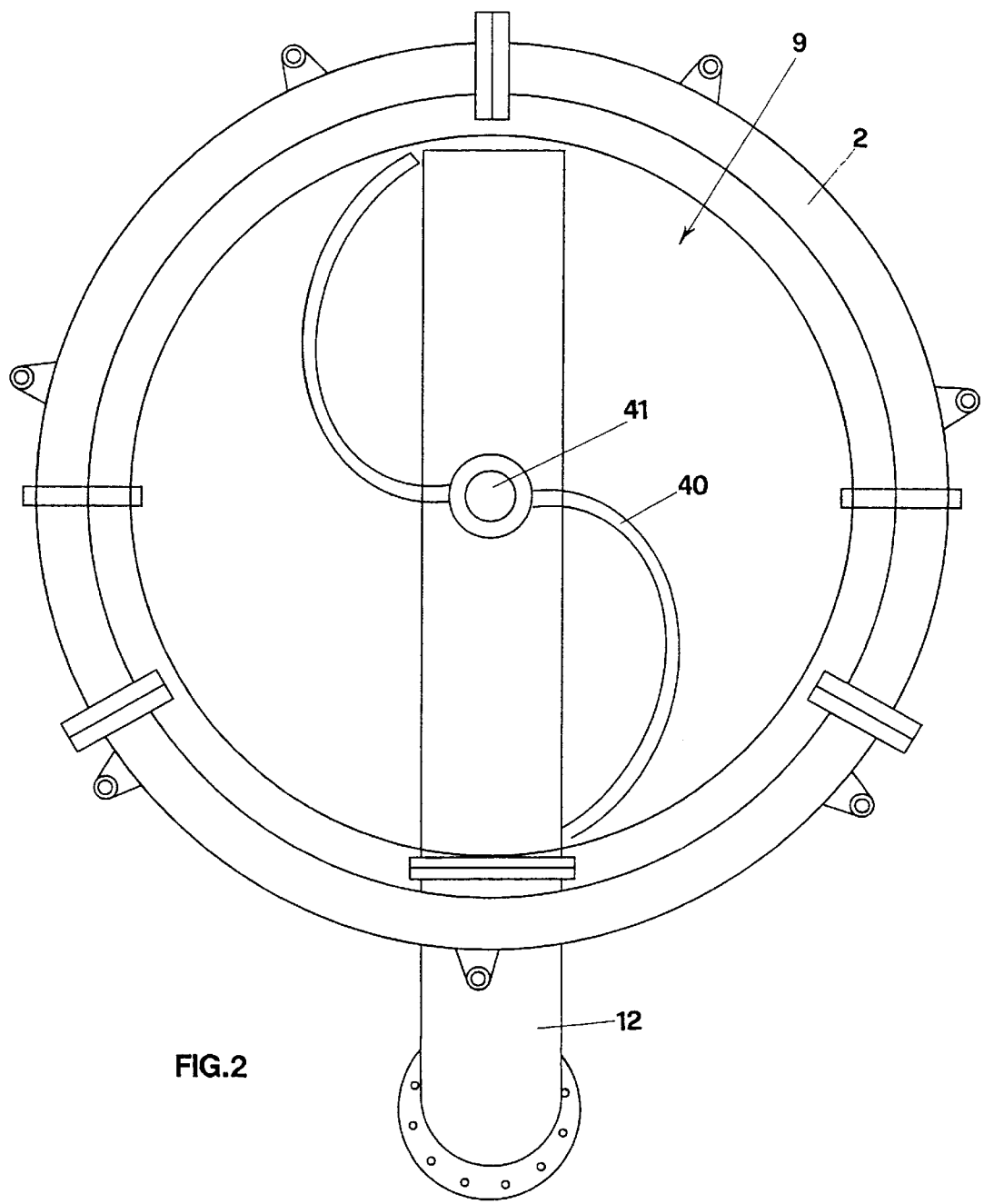
FIG. 2 shows the reactor of FIG. 1 in a top view where one of the rotating blades with which it is supplied is in evidence.

Inside the tank 2, as FIG. 1 shows, a plurality of blades 40, being one of them visible also in FIG. 2, is present. Said blades, by a vertical shaft 41, connected with a ratiomotor group 42, are set on rotation, creating turbulence in the liquid contained in the tank.

The surface of said blades is of a porous material, and therefore, each of them substantially forms a reactor which makes easy the intimate exchange in between the air bubbles and the liquid to be purified, and the capture of the pollutant by the air bubbles.

Figure 3:
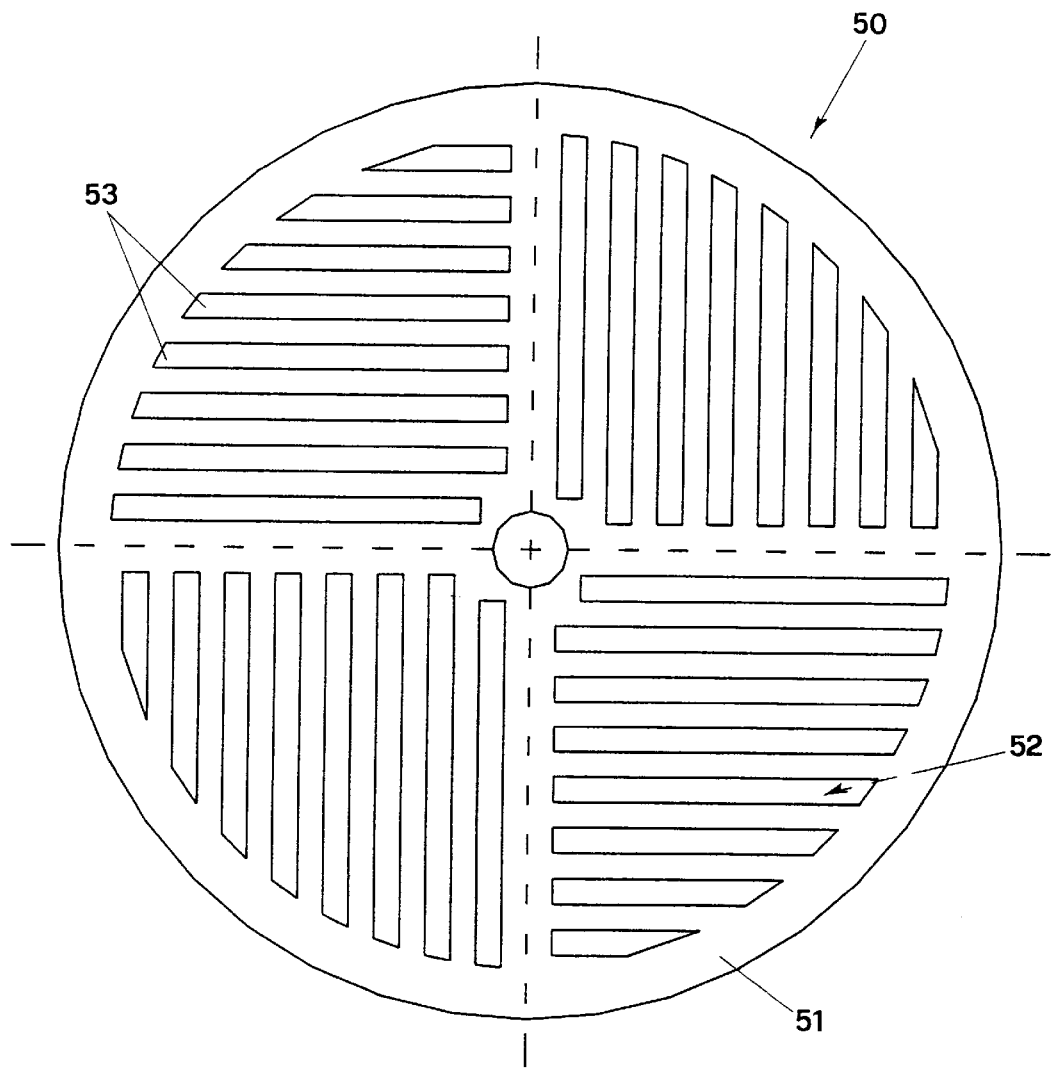
FIG. 3 shows in a top view the baffle applied to each blade which equips the reactor of the invention.
Figure 4:
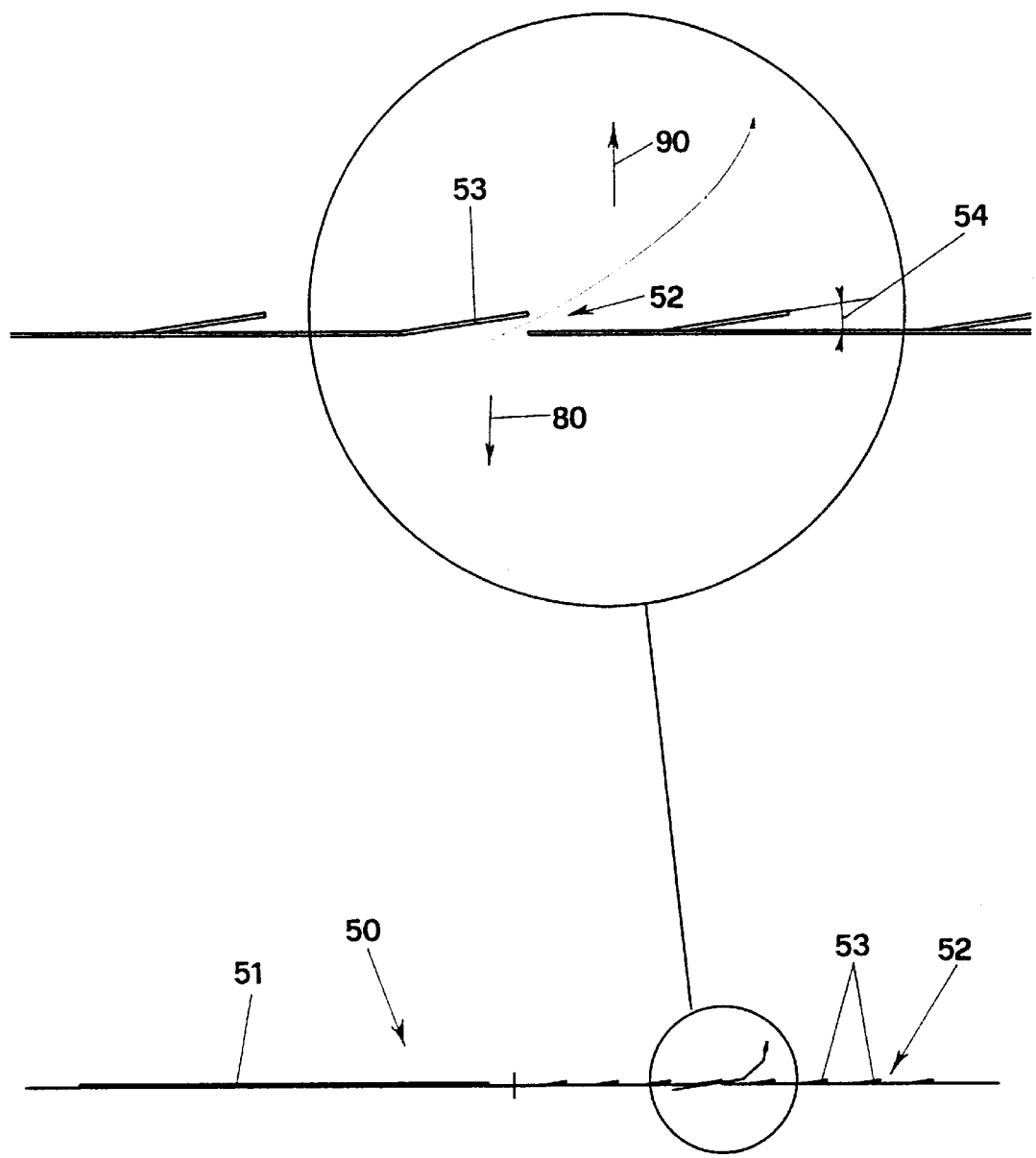
FIG. 4 shows the cross section of the baffle of FIG. 3.

A baffle, indicated as a whole with 50, and represented in plan in FIG. 3, is applied on each blade 40, in order to stabilize the turbulent flows which are created. Said baffle, as it can be observed, is formed of a disk 51, on whose surface, as FIG. 4 show in particular, a plurality of openings 52 is realised.

Said openings are realised opening by shearing in the disk 51 a plurality of longitudinal slots 52, and bending a part of the sheared material in order to realise a plurality of tongues 53, being each of them inclined upwards with an angle 54.

Such angle of inclination 54 is substantially corresponding with the angle, according to which, the resultant speed, which is obtained compounding the ascent speed of the aeriform substance dispersed in the liquid to be purified, with the rotation speed of the disk 51 itself, is inclined.

This way a stabilization of the flow of the descending liquid, according to the direction 80, and of the ascending air bubbles containing the impurities captured by the liquid, according to the direction 90, is obtained.

Besides, it can be observed that said openings 52 are realised in all the four quadrants of 90°, according to which the disk 51 is divided, and are arranged in such a way that the openings 52 and the corresponding tongues 53 realised in any of the quadrants, are orthogonal to the openings and to the corresponding tongues realised in the next quadrants and this in order to obtain an improvement of the purification efficiency.

The presence of the baffle 50, with the presence of the low box 9, permits to the perfected reactor of the invention to improve the purification efficiencies, making them equivalent to the purification levels achievable by a couple of reactors belonging to the known technique, arranged in a cascade connection.

During the executive phase some changes could be introduced in the reactor of the invention, or it could be realised according to building variants which, if based on the same idea of solution described, are to be considered protected by the present patent.

During the executive phase some changes in different measures of the rotating blades or of the outward covering which forms the reactor itself, could be introduced in the reactor of the invention.

Therefore it is clear that said reactor could be realised with any shape or dimension.

What is claimed is:

1. A reactor for purification of liquids comprising:
   a tank having a central axis for containing the liquid to be purified said liquid having a free surface;
   a plurality of upper injector circularly arranged in an upper portion of the tank near the free surface of the liquid for introducing into the tank the liquid to be purified with an aeriform substance in the form of bubbles dispersed in the liquid;

a rotatable shaft disposed in the tank along the central axis;

at least one blade arranged inside said tank and connected with the shaft for agitating said liquid;

first interception means, liquid in the tank at a lower position with respect to the upper injectors;

at least one intermediate injector communicating with the first interception means for reintroducing the liquid and aeriform substance into the tank at a height below the plurality of upper injectors and above said first interception means;

a second interception means arranged at the bottom of the tank;

draining means for pushing away from the free surface of said liquid a foam formed by said bubbles and being loaded with impurities captured from said liquid; and a low box, which comprises a container, is arranged inside said tank at an intermediate height below said at least one intermediate injector for receiving a first portion of the liquid during the purification while permitting a second portion of the liquid to flow toward the bottom of the tank, said low box including said second interception means in a lower portion of the lower box for permitting the suction and re-flowing of said liquid inside the tank.

2. A reactor according to the claim 1 wherein said low box has the shape of a basin with a bottom converging towards the central axis.

3. A reactor according to claim 1 wherein said first interception means includes an upwardly converging hood;

a pipe coupled to the hood; and pumping means for the suction of said liquid for the first interception means to the pipe.

4. A reactor according to claim 1 wherein said draining means comprises a blade connected with said rotable shaft and a draining conduit communicating with the tank in correspondence with the free surface of said liquid.

5. A reactor according to claim 1 wherein each of said injectors includes a feeding pipe for the liquid to be purified and a parallel connected suction pipe line communicating with atmosphere and through which the liquid that flows through said feeding pipe sucks air up from the environment by a venturi effect.

6. A reactor according to the claim 2 wherein said at least one rotating blade includes a baffle formed of an apertured disk, having a plurality of through openings for permitting the passage of a descending flow of liquid during the purification and permitting passage of an ascending flow of the aeriform substance dispersed in said liquid.

7. A reactor according to claim 6 wherein said openings are formed of a plurality of slots in said disk, each being delimited by a tongue inclined upwards at an angle relative to a plane of said disk.

8. A reactor according to claim 7 wherein said slots and said tongues are located in all of four quadrants of 90° of said disk.

9. A reactor according to claim 8 wherein said slots and said tongues in each of said quadrants being parallel to each other and orthogonal to the slots and to the tongues in any adjacent quadrant.

10. A reactor according to claim 1 comprising a ratiomotor group for rotating the shaft.

* * * * *